April 22, 1958 F. FARBER 2,831,577
LEVELLING THE GRAIN CLEANING AND SEPARATING
MECHANISM IN HARVESTERS
Filed Aug. 12, 1957 7 Sheets-Sheet 1

INVENTOR.
Frank Farber
BY
Atty.

April 22, 1958  F. FARBER  2,831,577
LEVELLING THE GRAIN CLEANING AND SEPARATING
MECHANISM IN HARVESTERS
Filed Aug. 12, 1957  7 Sheets-Sheet 3

INVENTOR.
Frank Farber
BY
Atty.

April 22, 1958 F. FARBER 2,831,577
LEVELLING THE GRAIN CLEANING AND SEPARATING
MECHANISM IN HARVESTERS
Filed Aug. 12, 1957 7 Sheets-Sheet 7

INVENTOR.
Frank Farber
BY
Atty.

United States Patent Office 2,831,577
Patented Apr. 22, 1958

2,831,577

LEVELLING THE GRAIN CLEANING AND SEPARATING MECHANISM IN HARVESTERS

Frank Farber, Moscow, Idaho

Application August 12, 1957, Serial No. 677,529

10 Claims. (Cl. 209—416)

The present invention relates to improvements in grain harvesters, and more particularly to improvements in means for levelling the grain cleaning and separating mechanism in such harvesters.

In recent years, the combine harvester, or harvester-thresher, has become the universally accepted machine for harvesting grain crops. A conventional machine of this character comprises a body unit containing threshing and separating apparatus, which carries in front of it, a header unit containing grain cutting and conveying apparatus. As the machine is moved through the fields, grain cut by the cutting apparatus is conveyed to the body unit where it is threshed, and where the grain kernels are separated from the straw and chaff.

Conventional grain harvesters include as a part of the separating mechanism horizontally disposed screens or sieves upon which the kernels, chaff, and unthreshed heads are deposited after the straw is separated from them. The screens or sieves are reciprocated rapidly in a fore and aft direction in the path of a rearwardly and upwardly directed stream of air from a fan mounted in the body unit to separate the kernels from the chaff and unthreshed heads. The small, relatively heavy kernels pass through the screens and are collected therebeneath. The light chaff is blown out of the rear end of the body unit. The unthreshed heads, being too large to pass through the screens but too heavy to be blown with the chaff, drop from the rear edges of the screens and are collected for rethreshing. It is essential for proper operation of this mechanism that the screens be maintained in substantially level position, and that the blast of air be maintained uniform. If the screens are tilted forwardly or to either side, the grain piles up at the low point, and cannot be cleaned properly. If the screens are tilted rearwardly, the grain passes too rapidly over the screens and is sluffed off the rear edges instead of passing through.

In the operation of a machine of this character in fairly level fields no problem is presented in maintaining the screens level, and machines designed for use in substantially flat areas may have the cleaning screens supported directly on the body unit. In the operation of harvesters in hilly areas, however, a serious problem is presented, for the header unit and wheels of the machine must follow the changing ground contour. Heretofore the problem has been approached by operating the harvester around the hillsides transversely to the slope, following contour lines to maintain the grain cleaning mechanism as level as possible in a fore and aft direction. Transverse levelling has been satisfactorily accomplished by tilting the entire harvester body to one side or the other with respect to the wheels. While this approach has lessened the problem, it has not solved it, for it is not possible to follow contour lines exactly during the harvesting operation, and travel up or down grade is inevitable.

I am aware that several solutions to the problem of maintaining the cleaning mechanism level fore and aft during travel up or down grade have been suggested. These solutions generally comprise means for counterbalancing the cleaning mechanism about a transverse horizontal axis to provide instantaneous reaction to fore and aft tilting. While the concept of counterbalancing about a transverse axis is sound, the known devices to carry out this concept are not wholly satisfactory for one reason or another. As hereinbefore stated, it is not only necessary to maintain the screens level, but it is equally important that the air blast therethrough be maintained uniform at all times. The levelling devices suggested in the past have either ignored this problem completely, or have attempted to solve it by providing adjustable air deflecting means in the air stream which react to the levelling action of the counterbalancing to alter the direction of the air stream. This alteration of the air stream does have a beneficial result, but still does not wholly solve the problem, for in deflecting the air by windboards situated in the air stream, the volume and velocity of the air is altered, as well as the direction. This change in volume and velocity is not desirable.

It is the principal purpose of my invention to provide means for maintaining the cleaning mechanism of the combine harvester level in a fore and aft direction regardless of fore and aft tilting of the machine during the harvesting operation, in such a manner that the relation of the cleaning screens or sieves are maintained in unchanging relationship to the air stream issuing from the fan or blower apparatus.

A further purpose of the invention is to provide a novel supporting means for the cleaning mechanism operable to carry out the principal purpose of the invention in a novel, efficient, and commercially feasible manner.

In order to provide means for levelling the grain cleaning apparatus while maintaining it in unchanged relation to the air stream in which it is situated, it is necessary that the fan or blower be carried with the cleaning mechanism and moved therewith with respect to the body of the machine as the levelling operation is carried out. To move the fan or blower bodily is not feasible because of its bulk, weight, and because it must receive driving power from elements rigidly fixed to the body. Therefore, I accomplish my purposes by utilizing the fan shaft as the transverse pivotal axis about which the fore and aft levelling is carried out. With this construction the fan shaft may be supported rigidly on the main frame, and the fan housing may be made rotatable on the shaft to follow the movement of the screens therearound. The fan is thus maintained in unchanged relation with the screens at all times, and yet is not moved bodily with respect to the main body of the machine.

The nature and advantages of my invention will appear more clearly from the following description and the accompanying drawings, wherein a preferred form of the invention is disclosed. It should be understood, however, that the description and drawings are illustrative only, and are not intended to limit the invention except insofar as it is limited by the claims.

Figure 1:
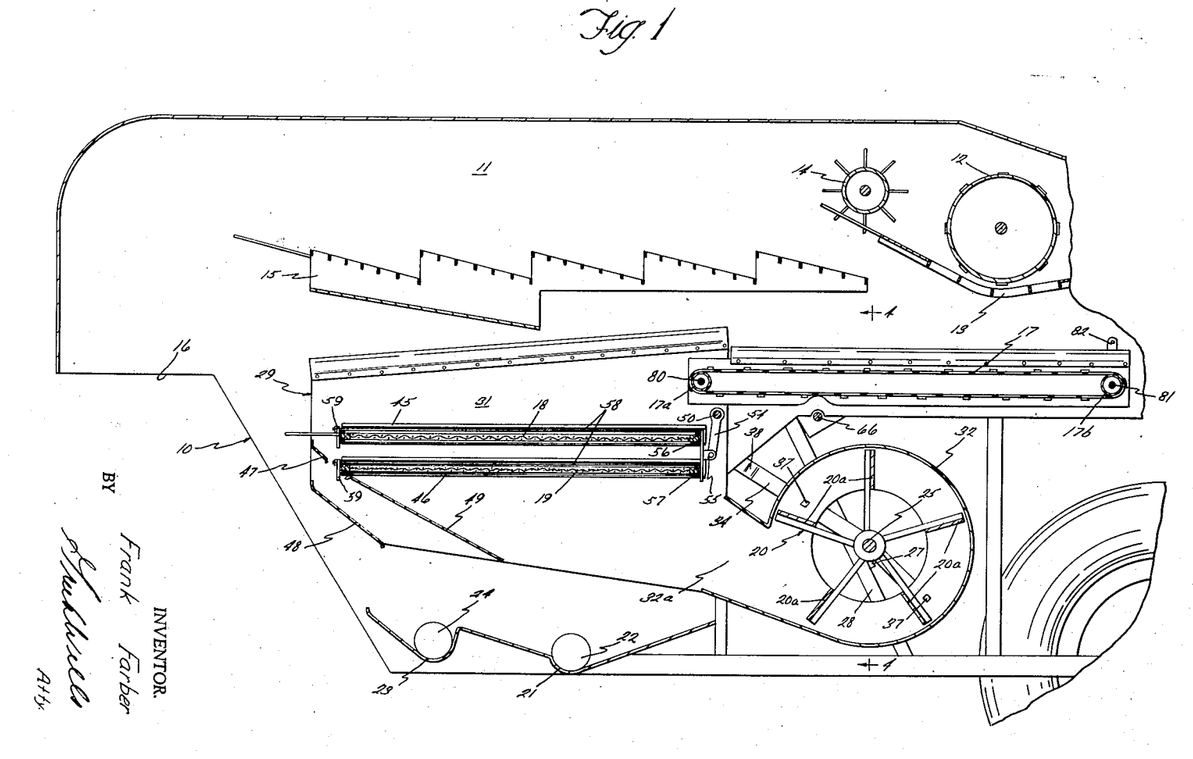
Figure 1 is a longitudinal sectional view through the body unit of a conventional combine harvester embodying my invention.

Referring now to the drawings, and to Figure 1 in particular, I have shown my invention as being embodied in a conventional combine harvester, indicated generally by the numeral 10. The harvester 10 includes a longitudinally elongated body 11 which forms a housing around the several threshing and separating elements. The threshing mechanism within the body 11 comprises the usual threshing cylinder 12 and concave grate 13 which receive the cut stalks from the header (not shown) and perform the threshing operation. Behind the cylinder 12, a toothed separating cylinder 14 is provided to engage the straw and throw it rearwardly onto straw walkers 15. The straw walkers 15, well known in the art, move the straw to the discharge opening 16 at the rear of the body 11, and in so doing, jostle it about to allow any grain kernels and unthreshed heads to drop out.

Below the concave grate 13, a grain conveyor or pan 17 is provided to receive the threshed grain and chaff and convey it to the cleaning and classifying mechanism therebehind. This mechanism is comprised essentially of upper and lower screens or sieves 18 and 19 of conventional design, and a blower fan 20. The fan 20 is situated in the housing below and forwardly of the screens 18 and 19 and is driven to create a blast of air upwardly and rearwardly through the screens 18 and 19. The screens are reciprocated fore and aft on this blast of air to agitate the material deposited thereon from the conveyor 17. Grain kernels deposited on the screens 18 and 19 are permitted to work through the screens and drop into a collecting trough 21 therebeneath which forms parts of the bottom of the body 11. The trough 21 contains a grain auger 22 which transports the grain transversely to an elevator (not shown) where it is elevated to a grain tank (not shown) on the machine. Chaff and other foreign material deposited on the screens, is caught in the air stream and blown out the discharge opening 16. Unthreshed heads are moved to the rear of the screens 18 and 19 and permitted to drop off into a tailings trough 23 where they are removed by a tailings auger 24 and returned to the threshing cylinder for recirculation through the machine.

Figure 4:
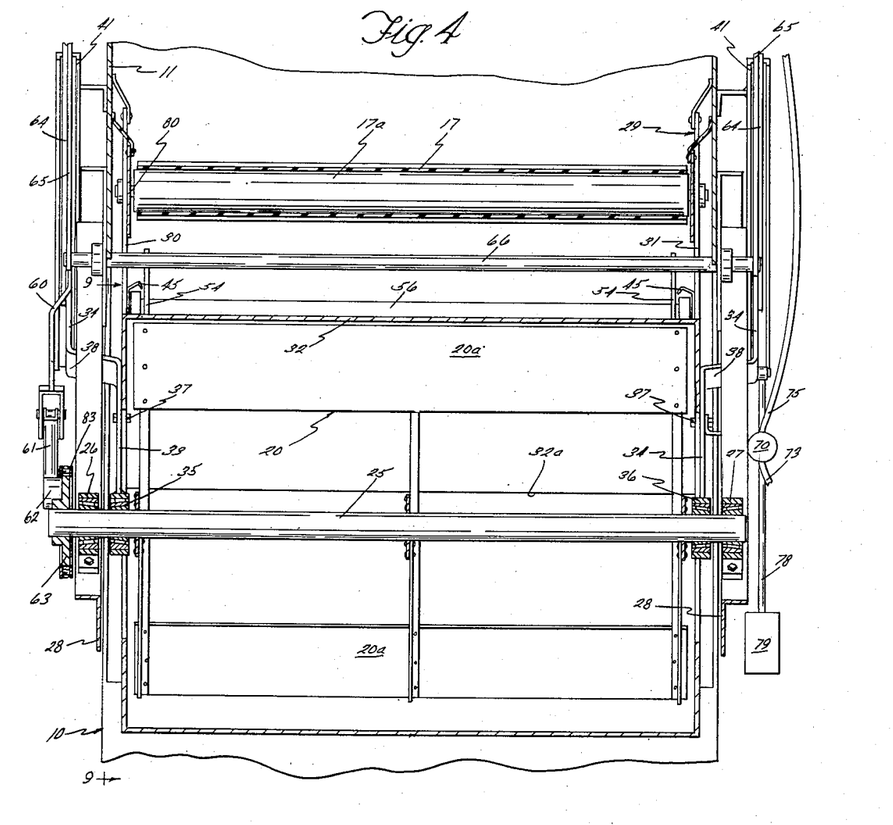
Figure 4 is an enlarged fragmentary sectional view taken substantially on the line 4—4 of Figure 1.

The purpose of this invention is to provide means for maintaining the screens 18 and 19 constantly level in a fore and aft direction, and for maintaining an unchanged relationship between the screens 18 and 19 and the blower fan 20, at all times. To accomplish this purpose, I utilize the transverse shaft 25 of the blower fan 20 as the pivotal axes about which levelling is carried out. The shaft 25 extends transversely of the body 11 and supports the fan blades 20a. As best shown in Figure 4, the fan shaft 25 is journalled in bearings 26 and 27 which are supported on frame members 28 rigidly secured to the body 11, and to the main frame of the harvester. The shaft 25 is thus fixed with respect to the harvester body 11.

Figure 2:
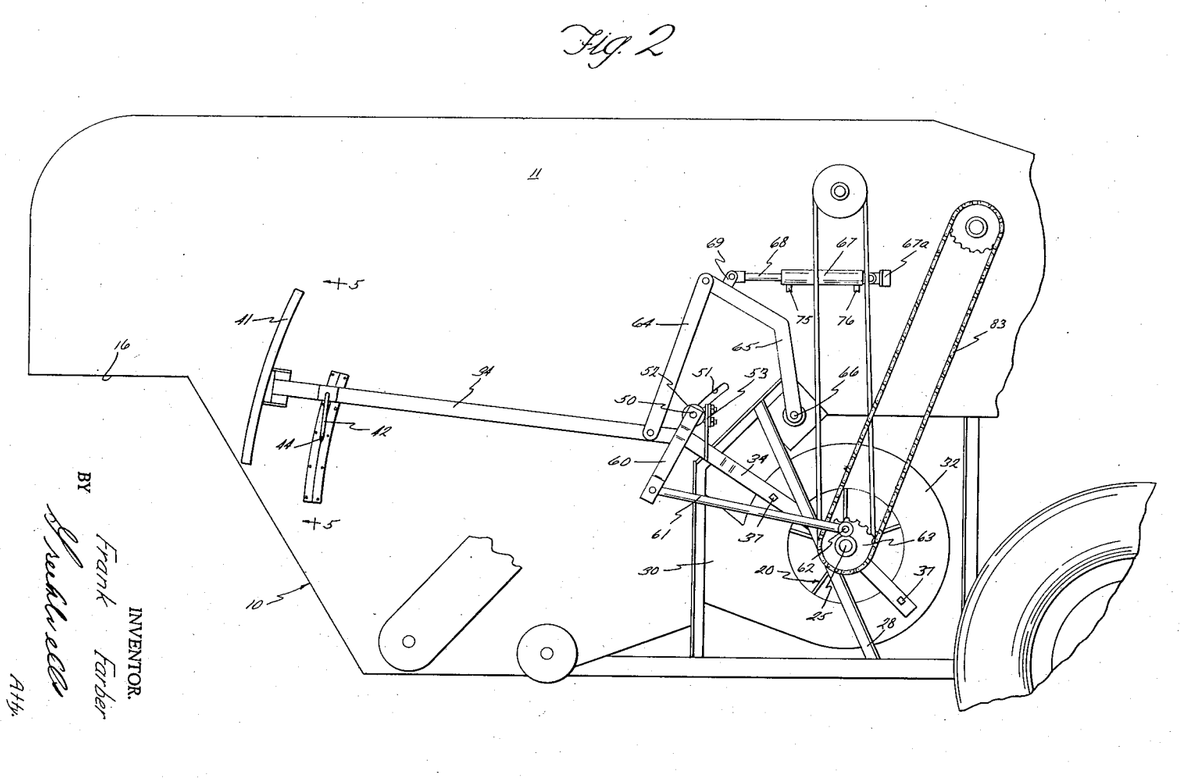
Figure 2 is a side elevational view of the harvester body.

The shaft 25 pivotally supports a cleaning shoe generally indicated at 29, upon which the elements to be levelled are supported. The shoe 29 is comprised of two transversely spaced vertical plates or walls 30 and 31 which are positioned inside the body 11 in close juxtaposition to the side walls thereof, together with a cylindrical fan housing 32 which forms part of the blower fan 20. As illustrated best in Figure 1, the fan housing 32 is joined at the plates 30 and 31, and its outlet port 32a is positioned between them. The fan housing 32 and its port 32a are thus in fixed relation to the shoe 29. To pivotally support the shoe 29 on the shaft 25, I provide a pair of supporting arms 33 and 34 which are rigidly secured to bearings 35 and 36 rotatably mounted on the shaft 25 immediately inside the frame members 28. The fan housing 32 is bolted to the arms 33 and 34 by bolts 37, as shown in Figures 2, 3, 4 and 9. The arms 33 and 34 are bent outwardly as indicated at 38 a short distance beyond the periphery of the fan housing 32, and progress rearwardly therefrom outside of the body 11 to points near the rear end thereof. The arms 33 and 34 have fixed to their rear ends guide rollers 39 and 40 which are adapted to ride in curved guide channels 41 fixed to the body 11. The guide channels 41 are curved about the shaft 25, as illustrated in Figure 2. The rollers 39 and 40 and the channels 41 maintain the arms 33 and 34 in proper alignment with the body 11. Near the rearward ends of the arms 33 and 34 links 42 and 43 are supported. The links 42 and 43 extend downwardly a short distance below the arms 33 and 34, and then inwardly through curved slots 44 provided in the sidewalls of the body 11. The links 42 and 43 are secured to the walls 30 and 31 of the shoe 29 and serve to support the rearward end of the shoe 29 to the arms 33 and 34.

Figure 5:
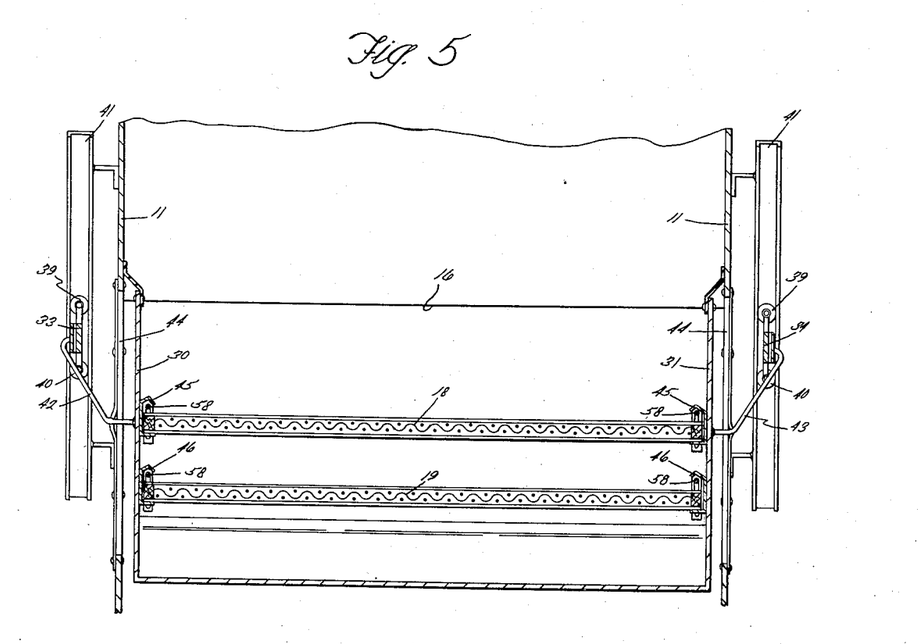
Figure 5 is an enlarged fragmentary sectional view taken on the line 5—5 of Figure 2.
Figure 6:
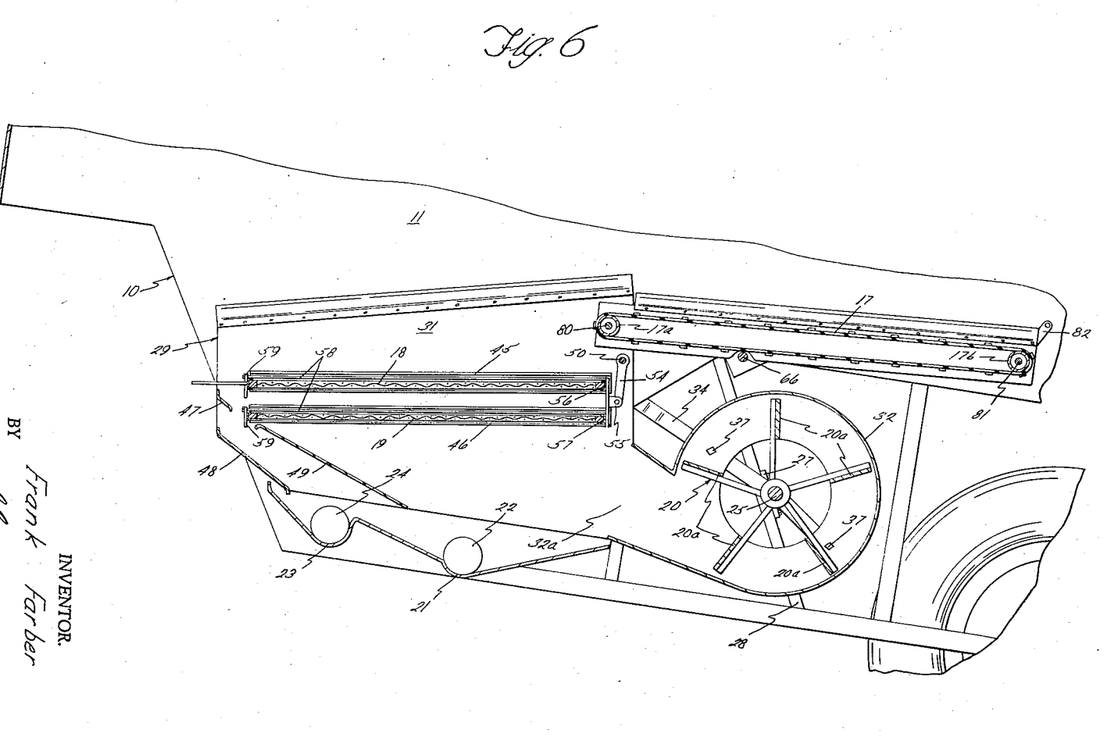
Figure 6 is a view similar to Figure 1 but showing the machine travelling down an incline.

The screens 18 and 19 are supported in the cleaning shoe 29. As best shown in Figures 1 and 5, each wall 30 and 31 of the shoe 29 is provided with a pair of vertically spaced horizontal screen guides 45 and 46 in which the upper and lower screens 18 and 19 are slidably received. With this construction the screens 18 and 19 are supported within the body 11 for free movement with the cleaning shoe 29 about the axis of the fan shaft 25. Suitable baffles 47, 48 and 49 are provided between the walls 30 and 31 of the shoe 29 to direct the material falling from the screens 18 and 19 into the hopper or collecting trough below.

In order to reciprocate the screens 18 and 19 within the shoe 29, a shaking mechanism is provided. This mechanism includes a transverse shaker shaft 50 which extends across the shoe 29 in front of the screens 18 and 19. The shaft 50 extends outwardly through curved slots 51 in the side walls of the body 11 and is journalled in bearings 52 which are supported by brackets 53 secured to the arms 33 and 34 intermediate their ends. The shaft 50 has radial levers 54 thereon which are pivoted to a shaker frame 55 positioned at the front of the screens 18 and 19. The shaker frame 55 includes transverse channel members 56 and 57 which receive the front edges of the screens 18 and 19, and also includes longitudinally rods 58 which extend rearwardly above the side edges of the screens 18 and 19 to their rearward ends. The rods 58 have clamp members 59 at their rearmost ends which are engaged with the screens 18 and 19 to secure them to the shaker frame 55. A lever 60 is fixed at one end of the shaft 50 as shown in Figure 2. The lever 60 is pivoted to a pitman arm 61 which, in turn, is pivoted to an eccentric pin 62 mounted on a gear 63 fixed to the fan shaft 25. As the fan shaft 25 is rotated the eccentric pin 63, the pitman 61, and lever 60 impart a rocking motion to the shaft 50 which is transmitted through the levers 54 to the shaker frame 55, to reciprocate the frame 55 and the screens 18 and 19 in a fore and aft direction. Since the reciprocating mechanism just described is wholly supported on the arms 33 and 34, and in the shoe 29, and since the power for this mechanism is transmitted from the shaft 25, there is no interference with the free pivotal movement of the shoe 29 within the housing 11 as levelling is accomplished.

Figure 7:
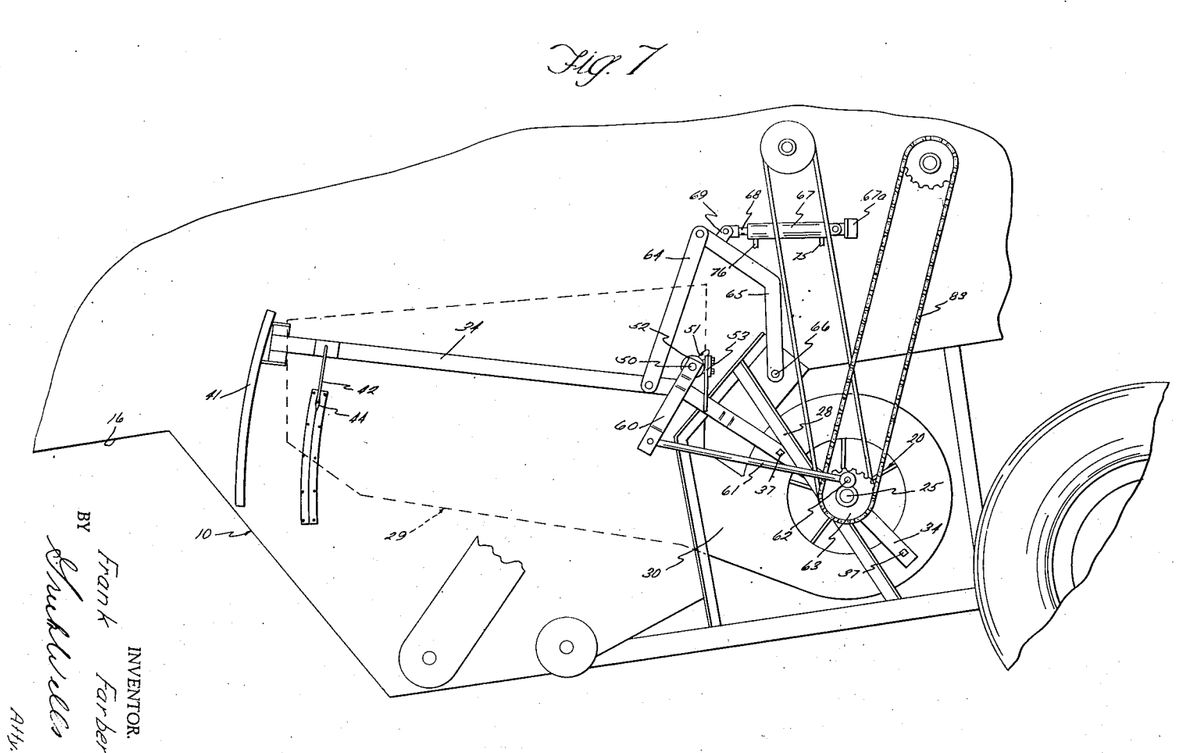
Figure 7 is a view similar to Figure 2, but showing the machine travelling up an incline.

The levelling of the shoe 29 and the cleaning mechanism carried thereby is accomplished by swinging the arms 33 and 34 upwardly or downwardly about the fan shaft 25 until the screens 18 and 19 in the shoe 29 are maintained in level position. In order to swing the arms 33 and 34 I provide a control link 64 at each side of the body 11. The links 64 have their lower ends pivoted to the supporting arms 33 and 34, as illustrated in Figures 2 and 7. The upper ends of the control links 64 are pivoted to levers 65 secured to the opposite ends of a transverse shaft 66 journalled in the body 11. Hydraulic jacks 67 are pivoted to brackets 67a mounted on the body 11 above the lever arms 65. The hydraulic jacks 67 have pistons 68 therein which are pivoted to ears 69 on the levers 65. The jacks 67 control the pivotal movement of the lever arms 65 about the shaft 66, and through the control arms 64, support the arms 33 and 34 and consequently the shoe 29. If the jacks 67 are operated to lower the lever arms 65 the supporting arms 33 and 34 are pivoted downwardly about the center of the fan shaft 25 and the cleaning shoe 29 is pivoted downwardly. If the jacks 67 are operated to raise the lever arms 65 then the arms 33 and 34 are also raised, and carry the cleaning shoe 29 upwardly about the center of the shaft 25. It will thus be seen that the simple operation of the jacks 67 in response to movement of the body 11 away from levelling position is sufficient to level the cleaning shoe 29 and the screens 18 and 19 carried thereby.

Figure 3:
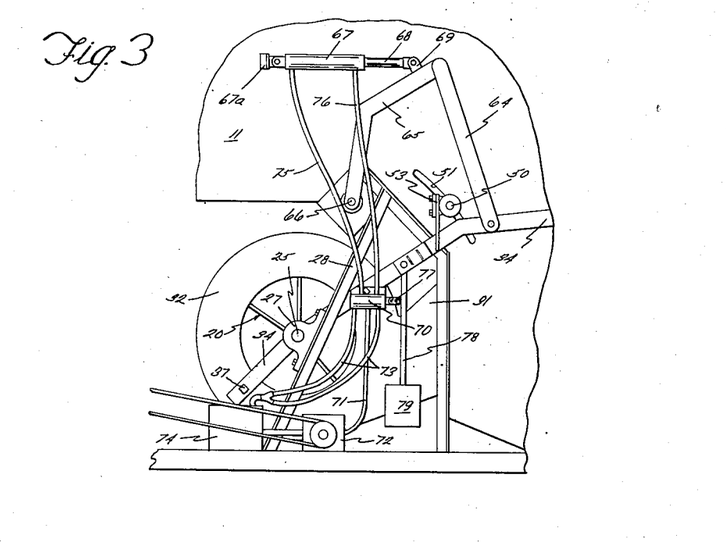
Figure 3 is a fragmentary side elevational view looking at the side opposite that shown in Figure 2.
Figure 8:
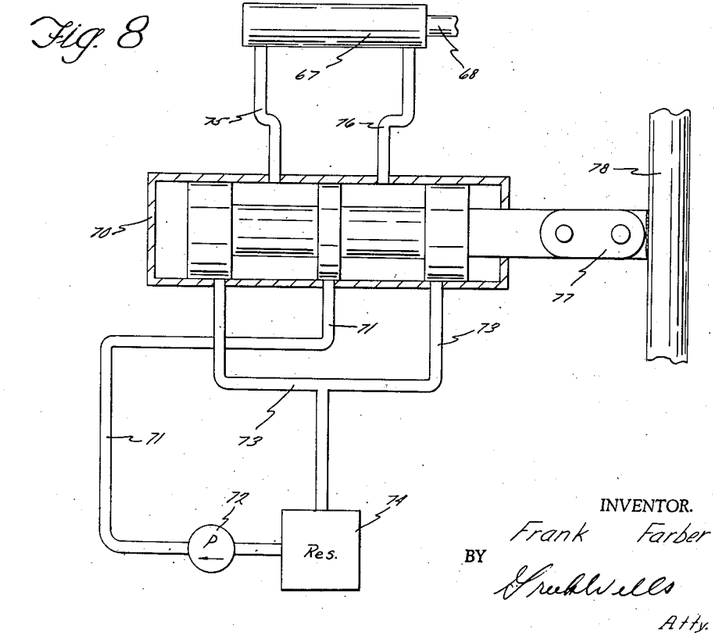
Figure 8 is a diagrammatic view illustrating the hydraulic levelling control mechanism.
Figure 9:
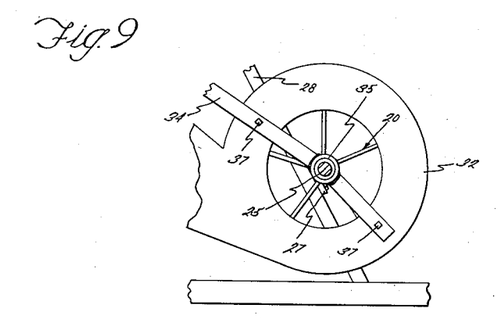
Figure 9 is a fragmentary sectional view taken on the line 9—9 of Figure 4.

In Figures 3 and 8, I have shown a simple control mechanism capable of operating the jacks 67 in response to movement of the body 11 away from a longitudinally level position. As shown in Figure 3, a levelling control valve 70 is mounted on the right hand cleaning shoe supporting arm 34. The valve 70 has a fluid supply line 71 connected thereto which extends from a hydraulic pump 72 carried on the harvester and driven therefrom. The valve 70 also has a fluid return line 73 connected thereto which extends from a fluid reservoir 74 carried on the harvester. Fluid supply lines 75 and 76 are connected between the valve 70 and each of the hydraulic jacks 67. The valve 70 has an operating handle 77 thereon which is pivotally connected to a pendulum 78 suspended on the supporting arm 34 for pendulum movement in a fore and aft direction. The pendulum 78 has a weight 79 fixed at its lower end. So long as the supporting arm 34 remains in such a position that the cleaning shoe 29 is maintained level in a fore and aft direction the pendulum 78 holds the operating handle 77 of the valve 70 in a position to close both the fluid supply line 71 and the fluid return line 73 from the fluid lines 76 and 77 of the jacks 67, and the jacks 67 are locked to maintain the cleaning shoe 29 rigid with respect to the body 11. When the machine begins to travel down a grade, however, and the body 11 is inclined downwardly at the front, the pendulum 78 is pivoted forwardly by gravity and moves the operating handle 77 into the valve 70. As shown in Figure 8, movement of the handle 77 toward the valve 70 causes the fluid supply line 71 to be connected to the fluid lines 76 of the jacks 67 and causes the fluid line 75 of the jacks 67 to be connected to the fluid return line 73. Fluid is then forced from the pump 72 through the lines 76 into the jacks 67 to extend the pistons 68 and pivot the cleaning shoe 29 downwardly about the fan shaft 25. As the cleaning shoe 29 is pivoted downwardly, the pendulum 78 begins to swing back with respect to the valve 70 until it again closes the valve 70 when the cleaning shoe 29 has reached a level position. If the machine commences to travel up hill, the pendulum 78 is pivoted rearwardly by gravity and the operating handle 77 is pulled out of the valve 70, causing a fluid supply line 71 to be connected to the fluid lines 75 of the cylinder 67 to retract the pistons 68 and pivot the cleaning shoe 29 upwardly with respect to the body 11 until the cleaning shoe reaches a level position. Since both the valve 70 and the pendulum 78 are mounted on the arm 34, the arm 34 is always maintained in such a position that it supports the cleaning shoe 29 level in a fore and aft direction, regardless of the inclination of the body 11 away from level.

While the levelling control mechanism just described operates efficiently to maintain the cleaning shoe in a level position, I do not intend that my invention should be limited to such a mechanism. It is obvious that other types of levelling control mechanisms will operate just as efficiently and with the same results. Any control mechanism which may be adapted to operate the double acting hydraulic cylinder in direct response to movement of the control mechanism away from a level position is sufficient for my purposes.

In providing a mechanism for maintaining the cleaning and classifying mechanism of a combine harvester in a constantly level position, some attention must be paid to the grain conveyor or pan 17. While it is not necessary that this device be maintained in a level position, it is necessary that the proper relationship between the delivery end of the conveyor 17 and the cleaning and classifying mechanism be maintained. The delivery end of the conveyor or pan 17 must be maintained above the front ends of the screens 18 and 19 at all times, regardless of the position of the screens 18 and 19 with respect to the body 11. To accomplish this I pivot the delivery end of the conveyor 17 directly to the cleaning shoe 29. As illustrated best in Figures 1 and 4, the draper roller 17a at the delivery end of the conveyor 17 is mounted on a transverse shaft 80 which is journalled in the walls 30 and 31 of the cleaning shoe 29. The draper roller 17a is thus maintained in fixed relation to the screens 18 and 19. The draper roller 17b at the forward end of the conveyor 17 is mounted on a transverse shaft 81 which is journalled in the free ends of depending links 82 that are pivoted to the side walls of the body 11 above the roller 17b. The links 82 permit the conveyor 17 to move longitudinally as the cleaning shoe 29 is pivoted about the fan shaft 25 during the levelling operation. Driving power for the conveyor 17 may either be provided by a belt and pulley means (not shown) extending between the fan shaft 25 and the shaft 80 at the delivery end of the conveyor 17, whereby a belt and pulley means not shown, extends from the pivotal axis at the top of the links 82 to the shaft 81 of the draper roller 17b at the front end of the conveyor. In those cases where a reciprocating pan is utilized instead of the conveyor 17 reciprocating power may be provided by lever means connected to the rock shaft 50.

I have not attempted to show a complete drive train for the several operating parts of the harvester, since the details of the drive train vary considerably in the several makes and models of conventional combine harvesters presently on the market. My invention may be adapted to any of these conventional harvesters. The only change that need be made from the existing drive train is the change in the manner of reciprocating screens 18 and 19. It is essential to proper operation of my invention that the reciprocating means be driven from the fan shaft 25. The fan shaft 25 may be powered from any suitable source, as for example from the threshing cylinder 12 by means of a chain 83 drivingly connected to the gear 63 fixed on the fan shaft 25.

It should be apparent from the foregoing that my invention provides a simple, efficient, and economically feasible means for maintaining the cleaning and classifying mechanism of a conventional combine harvester level in fore and aft direction regardless of the inclination of the body of the combine with respect to level. By utilizing the fan shaft 25 as the transverse axis about which the leveling operation is performed, it is possible with my invention to carry out the levelling operation while maintaining a fixed relationship between the screens 18 and 19 and the fan 20, without mounting the fan 20 for bodily displacement with respect to the body 11 of the machine. The novel mechanism which I utilize to support the cleaning shoe on the fan shaft 25 provides adequate support for the cleaning and classifying mechanism, and provides a simple means for levelling this mechanism with respect to the body 11. Since this mechanism is comprised essentially of only two supporting arms 33 and 34 which extend rearwardly outside of the body 11 to points near the rear end thereof, my invention is adapted to be included in any conventional combine harvester without undue modification thereof.

It is believed the nature and advantages of my invention appear clearly from the foregoing description and the accompanying drawings.

Having thus described my invention, I claim:

1. In a separator housing for a combine harvester, a blower fan including a transverse fan shaft journalled in said housing and fan blades mounted on said shaft, a cleaning shoe positioned within said housing for bodily displacement therein, grain cleaning and classifying means mounted in said shoe, supporting means supporting said shoe, said supporting means being pivoted to the separator housing on the axis of the fan shaft, lifting and lowering means connected to said separator housing and to said supporting means for pivoting the cleaning shoe about the axis of the fan shaft to adjust the angle thereof with respect to the housing, a fan housing surrounding said fan blades, said housing having an air outlet directed toward the cleaning shoe, means to support said fan housing for rotation about the fan shaft in fixed relation to said shoe, and conveying means in said separator housing for conveying grain to said cleaning shoe.

2. The combination defined in claim 1 including activating control means connected to said lifting and lowering means operable to actuate said lifting and lowering means in response to movement of said separator housing away from longitudinally level position.

3. In a separator housing for a combine harvester, a blower fan including a transverse fan shaft journalled in said housing and fan blades mounted on said shaft, a cleaning shoe positioned within said housing for bodily displacement therein, grain cleaning and classifying means mounted in said shoe, said cleaning shoe being pivoted to the separator housing on the axis of the fan shaft, lifting and lowering means connected between the shoe and the separator housing for pivoting the shoe about the axis of the fan shaft to adjust the angle of the shoe with respect to the housing, a fan housing having an air outlet therein directed toward the cleaning shoe, said fan housing being pivoted to the separator housing on the axis of the fan shaft in fixed relation to the cleaning shoe, and conveying means in said separator housing for conveying grain to the cleaning shoe.

4. The combination defined in claim 3 including actuating control means connected to said lifting and lowering means operable to actuate said lifting and lowering means in response to movement of said separator housing away from longitudinally level position.

5. In a separator housing for combine harvester, a blower fan including a transverse fan shaft and fan blades mounted on said shaft, a cleaning shoe positioned within said housing for bodily displacement therein, grain cleaning and classifying means mounted in said shoe, said cleaning shoe being pivoted to the separator housing on the axis of the fan shaft, lifting and lowering means connected between the shoe and the separator housing for pivoting the shoe about the axis of the fan shaft to adjust the angle of the shoe with respect to the housing, a fan housing having an air outlet therein directed toward the cleanng shoe, said fan housing being pivoted to the separator housing on the axis of the fan shaft in fixed relation to the cleaning shoe, and conveying means in said separator housing for conveying grain to the cleaning shoe.

6. In a separator housing for a combine harvester, a blower fan including a transverse fan shaft journalled in said housing and fan blades mounted on said shaft, a cleaning shoe positioned within said housing for bodily displacement therein, grain cleaning and classifying means mounted in said shoe, said cleaning shoe being pivoted to the separator housing on the axis of the fan shaft, lifting and lowering means connected between the shoe and the separator housing for pivoting the shoe about the axis of the fan shaft to adjust the angle of the shoe with respect to the housing, a fan housing having an air outlet therein directed toward the cleaning shoe, said fan housing being pivoted to the separator housing on the axis of the fan shaft in fixed relation to the cleaning shoe, and conveying means in said separator housing for conveying grain to the cleaning shoe, said conveying means having one end pivoted to said shoe, and link means pivoted to the opposite end of said conveying means and to said separator housing to support said opposite end.

7. In a separator housing for a combine harvester, a blower fan including a transverse fan shaft journalled in said housing and fan blades mounted on said shaft, a cleaning shoe positioned within said housing for bodily displacement therein, grain cleaning and classifying means mounted in said shoe, supporting means supporting said shoe, said supporting means being pivoted to the separator housing on the axis of the fan shaft, lifting and lowering means connected to said separator housing and to said supporting means for pivoting the cleaning shoe about the axis of the fan shaft to adjust the angle thereof with respect to the housing, a fan housing surrounding said fan blades, said housing having an air outlet directed toward the cleaning shoe, means to support said fan housing for rotation about the fan shaft in fixed relation to said shoe, and conveying means in said separator housing for conveying grain to said cleaning shoe, said conveying means having one end pivoted to said shoe, and link means pivoted to the opposite end of said conveying means and to said separator housing to support said opposite end.

8. In a separator housing for a combine harvester, a blower fan including a transverse fan shaft journalled in said housing and fan blades mounted on said shaft, a cleaning shoe positioned within said housing for bodily displacement therein, grain cleaning and classifying means mounted in said shoe, supporting arms supporting said shoe, said arms being pivoted to the separator housing on the axis of the fan shaft, hydraulically controlled lifting and lowering means connected to the separator housing and to said arms for pivoting the cleaning shoe about the axis of the fan shaft to adjust the angle of the shoe with respect to the housing, a fan housing having an air outlet directed toward the cleaning shoe, said fan housing being fixed to said supporting arms for rotation about the axis of the fan shaft in fixed relation to the cleaning shoe, and conveying means in said separator housing for conveying grain to said cleaning shoe.

9. In a separator housing for a combine harvester, a blower fan including a transverse fan shaft journalled in said housing and fan blades mounted on said shaft, a cleaning shoe positioned within said housing for bodily displacement therein, grain cleaning and classifying means mounted in said shoe, supporting arms supporting said shoe, said arms being pivoted to the separator housing on the axis of the fan shaft, hydraulically controlled lifting and lowering means connected to the separator housing and to said arms for pivoting the cleaning shoe about the axis of the fan shaft to adjust the angle of the shoe with respect to the housing, a fan housing having an air outlet directed toward the cleaning shoe, said fan housing being fixed to said supporting arms for rotation about the axis of the fan shaft in fixed relation to the cleaning shoe, and conveying means in said separator housing for conveying grain to said cleaning shoe, said conveying means having one end pivoted to said shoe, and link means pivoted to the opposite end of said conveying means and to said separator housing to support said opposite end.

10. In a separator housing for a combine harvester, a blower fan including a transverse fan shaft journalled in the housing and fan blades mounted on said shaft, a cleaning shoe positioned within said housing pivoted to the housing on the axis of the fan shaft, shaker means mounted in said shoe, sieves supported in said shoe and connected with said shaker means, crank means on said fan shaft, a pitman arm connected to said crank means and to said shaker means whereby to actuate the shaker means upon rotation of the fan shaft, lifting and lowering means connected between the shoe and the separator housing for pivoting the shoe about the axis of the fan shaft to adjust the angle of the shoe with respect to the housing, a fan housing having an air outlet therein directed toward the cleaning shoe, said fan housing being pivoted to the separator housing on the axis of the fan shaft in fixed relation to the cleaning shoe, and conveying means in said separator housing for conveying grain to the cleaning shoe.

References Cited in the file of this patent

UNITED STATES PATENTS

| | | |
|---|---|---|
| 894,439 | Hovland | July 28, 1908 |
| 1,852,361 | Naffziger | Apr. 5, 1932 |